(12) United States Patent
Kanemoto et al.

(10) Patent No.: US 8,883,349 B2
(45) Date of Patent: Nov. 11, 2014

(54) ALKALINE SECONDARY BATTERY AND METHOD FOR MANUFACTURING POSITIVE ELECTRODE MATERIAL FOR ALKALINE SECONDARY BATTERY

(75) Inventors: Manabu Kanemoto, Kyoto (JP); Masanori Morishita, Kyoto (JP); Tadashi Kakeya, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 0 days.

(21) Appl. No.: 13/814,349

(22) PCT Filed: Aug. 4, 2011

(86) PCT No.: PCT/JP2011/067857
§ 371 (c)(1),
(2), (4) Date: Feb. 5, 2013

(87) PCT Pub. No.: WO2012/018077
PCT Pub. Date: Feb. 9, 2012

(65) Prior Publication Data
US 2013/0136992 A1 May 30, 2013

(30) Foreign Application Priority Data
Aug. 5, 2010 (JP) .................................. 2010-176810

(51) Int. Cl.
*H01M 4/00* (2006.01)
(Continued)

(52) U.S. Cl.
CPC ............... *H01M 10/30* (2013.01); *C01G 51/00* (2013.01); *C01G 53/006* (2013.01); *H01M 4/52* (2013.01); *H01M 4/32* (2013.01); *H01M 4/62* (2013.01); *H01M 4/624* (2013.01); *C01P 2004/84* (2013.01); *C01P 2006/40* (2013.01); *H01M 4/364* (2013.01); *H01M 4/366* (2013.01); *C01P 2004/01* (2013.01); *Y02E 60/124* (2013.01); *C01P 2002/52* (2013.01)
USPC ......................................................... 429/223

(58) Field of Classification Search
None
See application file for complete search history.

(56) References Cited

U.S. PATENT DOCUMENTS 5,993,995 A   11/1999   Bernard et al.
6,136,473 A   10/2000   Furukawa et al.
(Continued)

FOREIGN PATENT DOCUMENTS

JP   08-031448   2/1996
JP   10-50308    2/1998
(Continued)

OTHER PUBLICATIONS

Wang et al., Surface behavior of pasted nickel electrodes with electrodeposited Co—Ce on substrate, Trans. Nonferrous Met. Soc. China 16(2006) 1148-1153.*

(Continued)

*Primary Examiner* — Patrick Ryan
*Assistant Examiner* — Jose Colucci Rios
(74) *Attorney, Agent, or Firm* — Rankin, Hill & Clark LLP

(57) ABSTRACT

An alkaline secondary battery includes a positive electrode containing a positive electrode material having nickel hydroxide, a cobalt-cerium compound containing cobalt and cerium, and a compound with at least one element of calcium, yttrium, europium, holmium, erbium, thulium, ytterbium and lutetium. Further, the positive electrode material is prepared by powder mixing nicked hydroxide particles, a cobalt-cerium compound, and a compound with at least one element of calcium, yttrium, europium, holmium, erbium, thulium, ytterbium and lutetium.

20 Claims, 4 Drawing Sheets

(51) Int. Cl.
*H01M 4/13* (2010.01)
*H01M 10/30* (2006.01)
*C01G 51/00* (2006.01)
*C01G 53/00* (2006.01)
*H01M 4/52* (2010.01)
*H01M 4/32* (2006.01)
*H01M 4/62* (2006.01)
*H01M 4/36* (2006.01)

(56) References Cited

U.S. PATENT DOCUMENTS

| | | | |
|---|---|---|---|
| 6,287,726 B1* | 9/2001 | Ohta et al. | 429/223 |
| 7,063,915 B1 | 6/2006 | Nogami et al. | |
| 2001/0018148 A1 | 8/2001 | Ohta et al. | |
| 2004/0175615 A1* | 9/2004 | Ovshinsky et al. | 429/223 |
| 2004/0197656 A1 | 10/2004 | Durkot et al. | |
| 2005/0053837 A1 | 3/2005 | Nogami et al. | |
| 2007/0245930 A1 | 10/2007 | Utagaki et al. | |
| 2008/0166635 A1 | 7/2008 | Miyamoto et al. | |
| 2009/0239144 A1* | 9/2009 | Izumi et al. | 429/206 |
| 2012/0115034 A1* | 5/2012 | Morishita et al. | 429/232 |

FOREIGN PATENT DOCUMENTS

| | | |
|---|---|---|
| JP | 10-074536 | 3/1998 |
| JP | 10-125315 | 5/1998 |
| JP | 10-261412 | 9/1998 |
| JP | 11-025962 | 1/1999 |
| JP | 2000-173606 | 6/2000 |
| JP | 2002-029755 | 1/2002 |
| JP | 2003-17064 | 1/2003 |
| JP | 2004-273138 | 9/2004 |
| JP | 2006-69807 | 3/2006 |
| WO | 97/12408 | 4/1997 |
| WO | 98/20570 | 5/1998 |
| WO | 99/43035 | 8/1999 |
| WO | 2006/064979 | 6/2006 |
| WO | 2011/007858 | 1/2011 |

OTHER PUBLICATIONS

Chang et al., Synthesis of gamma-CoOOH and its effects on the positive electrodes of nickel batteries, International Journal of Hydrogen Energy 34 (2009) 2435-2439.*

European Supplementary Search Report dated May 30, 2014, Application No. EP 11 81 4702.

International Search Report filed in PCT/JP2011/067857.

* cited by examiner (a)

(b)

(c)

(d)

(a)

(b)

(c)

ALKALINE SECONDARY BATTERY AND METHOD FOR MANUFACTURING POSITIVE ELECTRODE MATERIAL FOR ALKALINE SECONDARY BATTERY

TECHNICAL FIELD

The present invention relates to an alkaline secondary battery, especially a positive electrode material therefor and a method for manufacturing a positive electrode material.

BACKGROUND ART

An alkaline secondary battery is widely prevailing as a power source for portable electronic equipment, and is furthermore put into practical use as a power source for HEV (a so-called hybrid car).

With such prevalence, in recent years, further technical advancement in performance has been required for the alkaline secondary battery. Specifically, enhancement in performance of maintaining residual capacity by inhibition of self discharge, enhancement in charge efficiency (especially enhancement in charge efficiency at high temperatures), and the like have been required.

For inhibition of self discharge and enhancement in charge efficiency, in order to inhibit the oxygen evolution reaction which is a side reaction on recharging an alkaline secondary battery, the oxygen evolution potential (sometimes referred to as "oxygen overvoltage") is required to be raised.

As one technique for making the oxygen evolution potential shifted to the noble side (raised), for example as described in the following Patent Document 1, the technique using a positive electrode material for an alkaline secondary battery prepared by adding a rare earth element such as holmium (Ho) to an active material composed mainly of nickel hydroxide with a surface coated with a cobalt compound is known.

By using a positive electrode material added with a rare earth element as described above, the effect of inhibiting self discharge and enhancement in charge efficiency have been confirmed.

PRIOR ART DOCUMENT

Patent Document

Patent Document 1: Japanese Patent No. 3358702

SUMMARY OF THE INVENTION

Problems to be Solved by the Invention

By the technique described in the Patent Document 1, technical advancement in performance such as the effect of inhibiting self discharge and the enhancement in charge efficiency in an alkaline secondary battery is realized, but further enhancement in performance of the battery has been strongly desired by consumers of the alkaline secondary battery and the like, and under the current circumstances, there is also an aspect that it is not necessarily a satisfactory one sufficient to meet the requirements. Moreover, there is also a requirement for control of the total amount of additives in order to allow the active material to be included as much as possible.

The present invention has been made in view of these circumstances, and an object of the present invention lies in the point that the performance of an alkaline secondary battery is further enhanced.

Means for Solving the Problems

A first aspect in accordance with the present invention is characterized in that an alkaline secondary battery is configured to include a positive electrode containing a positive electrode material having nickel hydroxide, a cobalt-cerium compound, and a compound with at least one element of calcium, yttrium, europium, holmium, erbium, thulium, ytterbium, and lutetium.

That is, the effect of raising the oxygen evolution potential obtained by adding a compound with holmium (Ho) and the like to the nickel electrode in an alkaline secondary battery is known as the phenomenon in which the oxygen evolution potential is raised according to the increase in the addition amount, and the degree of the rise in oxygen evolution potential becomes smaller even when the addition amount over a certain amount is further increased.

Furthermore, in the domain where the above mentioned degree of the rise in oxygen evolution potential, becomes smaller, even when plural kinds of materials are added as the above mentioned additive elements, it is known as a result of experience that the effect of raising the oxygen evolution potential does not correspond to the sum of the effects of raising the oxygen evolution potential from each of the additive elements, and the effect is not more enhanced than the effect of raising the oxygen evolution potential obtained by adding a single additive in an amount corresponding to the total amount of those additives.

In other words, it has been considered that even when plural kinds of elements are added, after all, the total amount of additives simply increases, and the oxygen evolution potential is not raised beyond the relationship of the above mentioned degree of the rise in oxygen evolution potential with the increase in the addition amount in case where the single additive is added.

In contrast, the present inventors have found that the oxygen evolution potential can be further raised depending on a combination of materials constituting a positive electrode material for an alkaline secondary battery.

That is, in addition to a compound with at least one element of calcium (Ca), yttrium (Y), europium (Eu), holmium (Ho), erbium (Er), thulium (Tm), ytterbium (Yb) and lutetium (Lu), a cobalt-cerium compound is used as a positive electrode material.

Although the cobalt-cerium compound has a function as a electronic conductive additive as in the case of the cobalt compound in the Patent Document 1, when the percentage content of cerium is increased, the cobalt-cerium compound is capable of having high reduction resistance compared to the cobalt compound and of maintaining the function as a electronic conductive additive even when overdischarge occurs.

By using the cobalt-cerium compound and a compound with at least one element of calcium, yttrium, europium, holmium, erbium, thulium, ytterbium, and lutetium in combination as a positive electrode material, the oxygen evolution potential can be further raised even in the domain where it has been considered that the degree of the rise in oxygen evolution potential becomes smaller and no enhancement in oxygen evolution potential beyond that is possible.

There is an aspect that causes to be capable of exerting the above mentioned effect is not specified completely depending on the compound, but it is assumed that the oxygen evolution potential can be raised in this way because the cobalt-cerium compound and the compound with at least one element of calcium, yttrium, europium, holmium, erbium, thulium, ytterbium and lutetium complement each other and this contributes to the rise in oxygen evolution potential.

Hereinabove, the present invention is described focusing only on the effect of raising the oxygen evolution potential, but the cobalt-cerium compound has characteristics different from those of the compound with at least one element of calcium, yttrium, europium, holmium, erbium, thulium, ytterbium, and lutetium.

In general, the compound with calcium or the like is a material having high resistivity in some cases, and when the addition amount is too large, the decrease in conductivity and the like are caused. In case where the cobalt-cerium compound which is an electronic conductive additive is used, such problems do not occur and this also contributes to the rise in oxygen evolution potential while the compound appropriately serves as a high functional electronic conductive additive.

Moreover, a second aspect in accordance with the present invention is characterized, in addition to the configuration of the first aspect, in that the nickel hydroxide is formed in a particulate form, the cobalt-cerium compound is arranged to be in a state of coating the surface of the nickel hydroxide in a particulate form, and the compound with at least one element of thulium, ytterbium and lutetium is arranged to be in a state of being distributed inside the nickel hydroxide in a particulate form.

That is, among the compounds with at least one element of calcium, yttrium, europium, holmium, erbium, thulium, ytterbium and lutetium enumerated in the configuration of the first aspect, it was confirmed by analysis that with regard to the compounds with at least one element of thulium, ytterbium and lutetium, these compounds took characteristic forms of arrangement in the positive electrode material.

This will be described with reference to ytterbium as an example among thulium, ytterbium and lutetium.

A positive electrode in an alkaline secondary battery was composed of the positive electrode material prepared by combining nickel hydroxide which is an active material, a compound with ytterbium (more specifically, exemplified by $Yb_2O_3$), and a cobalt-cerium compound containing cobalt and cerium which were simultaneously precipitated by the coprecipitation method. A scanning electron microscope with analytical functions for materials was used to observe the positive electrode material after the alkaline secondary battery was charged and discharged. The results are shown in FIG. 3. As the nickel hydroxide described here, one that was formed in a particulate form was used.

FIG. 3(a) is an ordinary photomicrograph, and the positions at which the cross section of a nickel hydroxide particle is exposed in the state that is especially easy to distinguish it in FIG. 3(a) are shown as "(P)" and "(Q)".

FIG. 3(b), FIG. 3(c) and FIG. 3(d) show the distribution of cobalt element, cerium element and ytterbium element respectively, and slightly differ in magnification ratio from FIG. 3(a), but are images showing the same place. In each figure, the positions of the nickel hydroxide particle in FIG. 3(a) are shown as "(P)" and "(Q)" for comparison.

From FIG. 3(d), it can be seen that the ytterbium compound is dispersed and distributed into the interior of the nickel hydroxide particle by charging and discharging. It is thought that the nickel hydroxide particle has many minute pores, and the evolution of oxygen in the interior of the nickel hydroxide particle is inhibited since the ytterbium compound enters the minute pore.

On the other hand, from FIG. 3(c), the cerium element hardly enters the interior of the nickel hydroxide particle, and is dispersed on the surface of the nickel hydroxide particle. It can be presumed that the cerium thus dispersed on the surface of the nickel hydroxide particle inhibits the evolution of oxygen on the surface of the nickel hydroxide particle.

Namely, the ytterbium compound and the cerium differ from each other in their positions of the nickel hydroxide particle to which they are distributed, and both of them contribute to the rise in oxygen evolution potential.

This relationship is also common to a thulium compound or a lutetium compound.

In this context, for comparison, reference is also made to the analysis results obtained, instead of by allowing the cobalt-cerium compound to precipitate on the surface of the nickel hydroxide particle by the coprecipitation method, by allowing a cerium compound (specifically, exemplified by $CeO_2$) to mixedly coexist in the positive electrode material by powder mixing.

A positive electrode in an alkaline secondary battery was composed of the positive electrode material prepared by coating the surface of nickel hydroxide particles with a cobalt compound and powder mixing the particles with a cerium compound. The analysis results after the alkaline secondary battery was charged and discharged in the same manner as above are shown in FIG. 4.

FIG. 4(a) is an ordinary photomicrograph, FIG. 4(b) and FIG. 4(c) show the distribution of cobalt element and cerium element respectively, and in each figure, the position of the nickel hydroxide particle is shown as "(R)".

From FIG. 4(b), the cobalt elements are distributed mainly on the surface of the nickel hydroxide particle, but as seen from FIG. 4(c), the cerium elements are not dispersed over the surface of the nickel hydroxide particle, and clump together. That is, it follows that the cerium element (cerium compound) allowed to mixedly coexist in the positive electrode material by powder mixing is not involved in the rise in oxygen evolution potential.

In this connection, among the compounds with at least one element of calcium, yttrium, europium, holmium, erbium, thulium, ytterbium and lutetium enumerated in the configuration of the first aspect, with regard to the compounds other than the compound with thulium, the compound with ytterbium and the compound with lutetium, the phenomenon described above does not occur or the occurrence of the phenomenon described above is not confirmed, but the oxygen evolution potential is enhanced by an unconfirmed phenomenon.

Furthermore, with regard to the compound with thulium, the compound with ytterbium and the compound with lutetium, they have characteristics capable of greatly enhancing the oxygen evolution potential even at high temperatures.

Moreover, a third aspect in accordance with the present invention is characterized, in addition to the configuration of the first aspect, in that the positive electrode containing a positive electrode material having nickel hydroxide, a cobalt-cerium compound, and a compound with calcium is provided, and the mixing proportion of the compound with calcium is set to 0.1% by mass or more in terms of the abundance ratio of the calcium element relative to the total of the nickel hydroxide, the cobalt-cerium compound, and the calcium compound.

That is, in the domain where the mixing proportion of the compound with calcium is 0.1% by mass or more in terms of the abundance ratio of the calcium element relative to the whole positive electrode material, the degree of the rise in oxygen evolution potential relative to the increase in the compounds to be added becomes smaller.

Thus, in such a domain, it can be said that combining the cobalt-cerium compound and the compound with calcium has an advantageous effect especially on the point of raising the oxygen evolution potential.

Moreover, a fourth aspect in accordance with the present invention is characterized, in addition to the configuration of the first aspect, in that the positive electrode containing a positive electrode material having nickel hydroxide, a cobalt-cerium compound, and a compound with yttrium is provided, and the mixing proportion of the compound with yttrium is set to 0.5% by mass or more in terms of the abundance ratio of the yttrium element relative to the total of the nickel hydroxide, the cobalt-cerium, compound, and the compound with yttrium.

That is, in the domain where the mixing proportion of the compound with yttrium is 0.5% by mass or more in terms of the abundance ratio of the yttrium element relative to the whole positive electrode material, the degree of the rise in oxygen evolution potential relative to the increase in the compounds to be added becomes smaller.

Thus, in such a domain, it can be said that combining the cobalt-cerium compound and the compound with yttrium has an advantageous effect especially on the point of raising the oxygen evolution potential.

Moreover, a fifth aspect in accordance with the present invention is characterized, in addition to the configuration of the first aspect, in that the positive electrode containing a positive electrode material containing nicked hydroxide, a cobalt-cerium compound, and a compound with at least one element of europium, holmium, erbium, thulium, ytterbium and lutetium is provided, and the mixing proportion of the compound with at least one element of europium, holmium, erbium, thulium, ytterbium and lutetium is set to 1% by mass or more in terms of the abundance ratio of the element relative to the total of the nickel hydroxide, the cobalt-cerium compound, and the compound with at least one element of europium, holmium, erbium, thulium, ytterbium and lutetium.

That is, in the domain where the mixing proportion of the compound with at least one element of europium, holmium, erbium, thulium, ytterbium and lutetium is 1% by mass or more in terms of the abundance ratio of the element relative to the whole positive electrode material, the degree of the rise in oxygen evolution potential relative to the increase in the compounds to be added becomes smaller.

Thus, in such a domain, it can be said that combining the cobalt-cerium compound and the compound with at least one element of europium, holmium, erbium, thulium, ytterbium and lutetium has an advantageous effect especially on the point of raising the oxygen evolution potential.

Moreover, a sixth aspect in accordance with the present invention is characterized, as a method for manufacturing a positive electrode material for an alkaline secondary battery, in that the positive electrode material is prepared by mixing nickel hydroxide, a cobalt-cerium compound, and a compound with at least one element of calcium, yttrium, europium, holmium, erbium, thulium, ytterbium and lutetium.

By the present invention, it is made possible to raise the oxygen evolution potential by virtue of combination of the above mentioned compounds. Furthermore, it is made possible to enhance the reduction resistance of cobalt while maintaining the conductivity of the electrode material high.

Moreover, it is preferred that the positive electrode material be prepared by preparing nickel hydroxide particles coated with a cobalt-cerium compound and then powder mixing the particles with a compound with at least one element of calcium, yttrium, europium, holmium, erbium, thulium, ytterbium and lutetium.

According to the present invention, the cerium does not clump together and can be dispersed over the surface of the nicked particles. Furthermore, it is made possible to readily mix the compound with at least one element of calcium, yttrium, europium, holmium, erbium, thulium, ytterbium and lutetium with the nickel hydroxide particles coated with a cobalt-cerium compound.

Moreover, it is preferred that the step of allowing a compound containing cobalt and cerium to precipitate over the surface of the nickel hydroxide particles in an aqueous solution by simultaneous precipitation by the coprecipitation method be included.

It is preferred that the cobalt-cerium compound contain a cerium dioxide phase. Since the cobalt compound contains the cerium dioxide phase, the effect of inhibiting the cobalt oxyhydroxide from being reduced in a state of overdischarge is exerted.

When the abundance ratio of the cerium dioxide phase relative to the total of the cobalt oxyhydroxide phase and the cerium dioxide phase is 6.5% by mass or more, the reduction resistance is noticeably exhibited.

It is further preferred that the abundance ratio of the cerium dioxide phase relative to the total of the cobalt oxyhydroxide phase and the cerium dioxide phase be 13% by mass or more. When the abundance ratio of the cerium dioxide is 49% by mass, the specific resistance value maintains a low value which is almost unchanged from the value in the state of being added with no cerium. When being 88% by mass, the specific resistance value is raised, but practically, it is sufficiently small value.

That is, when the coprecipitation method is applied to an aqueous solution in which nickel hydroxide particles are present to allow the compound containing cobalt and cerium to precipitate, the precipitate precipitates so as to coat the surface of nickel hydroxide particles.

When the cobalt-cerium compound is prepared by the coprecipitation method, it may be prepared only from the materials for forming the cobalt-cerium compound in a state of not allowing nickel hydroxide particles to be present in the liquid. By using the cobalt-cerium compound thus prepared as a positive electrode material, the effect of raising the oxygen evolution potential is also exerted, but by coating the surface of nickel hydroxide particles with the cobalt-cerium compound as described above, it functions effectively as a electronic conductive additive even if small in amount and the oxygen evolution potential can be efficiently raised.

Effects of the Invention

According to the first aspect, it is further made possible to raise the oxygen evolution potential by using the cobalt-cerium compound and the compound with at least one element of calcium, yttrium, europium, holmium, erbium, thulium, ytterbium and lutetium in combination as a positive electrode material.

Furthermore, by allowing the cobalt-cerium compound to be included in a positive electrode material in terms of replacing the compound with calcium and the like, it is made possible to maintain the resistivity low while securing the performance equal to or greater than that before replacing with respect to the oxygen evolution potential, and to allow the positive electrode active material to effectively function.

By this operation, since the self discharge in the alkaline secondary battery is further inhibited, the performance of maintaining residual capacity in the alkaline secondary battery on standing may be further enhanced, and the charge efficiency in the alkaline secondary battery may be further enhanced. Thus, the performance of the alkaline secondary battery came to be further enhanced.

Moreover, according to the second aspect, the positions of each of the compounds are optimized and it is further made possible to raise the oxygen evolution potential.

Moreover, according to the third aspect, in case where the compound with calcium is included in the positive electrode material, it has been made possible to further raise the oxygen evolution potential in the domain where the rise in oxygen evolution potential could not be much expected heretofore.

Moreover, according to the fourth aspect, in case where the compound with yttrium is included in the positive electrode material, it has been made possible to further raise the oxygen evolution potential in the domain where the rise in oxygen evolution potential could not be much expected heretofore.

Moreover, according to the fifth aspect, in case where the compound with at least one element of europium, holmium, erbium, thulium, ytterbium and lutetium is included, in the positive electrode material, it has been made possible to further raise the oxygen evolution potential in the domain where the rise in oxygen evolution potential could not be much expected heretofore.

Moreover, by the sixth aspect, by combining the nickel hydroxide particles and the cobalt-cerium compound, it is efficiently made possible to raise the oxygen evolution potential.

EMBODIMENT OF THE INVENTION

Figure 1:
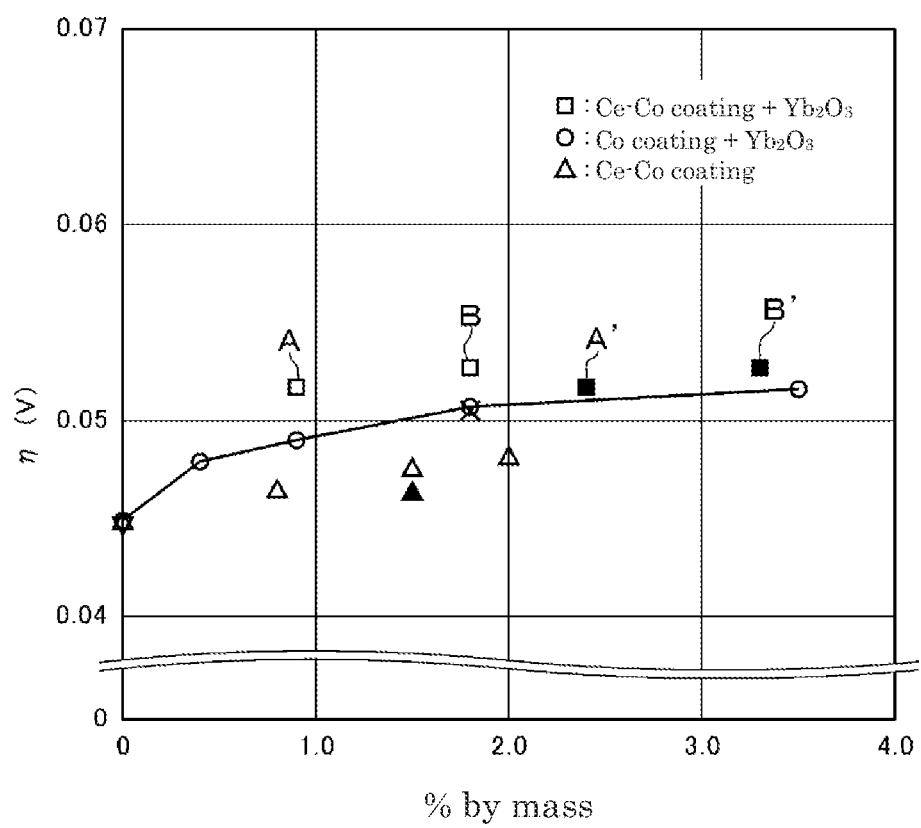
FIG. 1 is a graph showing the measurement results in accordance with embodiments of the present invention.

Hereinafter, embodiments of the alkaline secondary battery of the present invention will be described on the basis of the drawings.

In the embodiments, the alkaline secondary battery is exemplified by a nickel metal hydride battery and described.

With regard to the structure itself, since the alkaline secondary battery of the embodiment has the same structure as that of a conventional nickel metal hydride battery, detailed description for the structure is omitted, and reference will be made to the production step of the alkaline secondary battery.
[Preparation of Positive Electrode Material]

First, the production step of a positive electrode material for the alkaline secondary battery will be described.

In the alkaline secondary battery of the embodiment, nickel hydroxide is used as a positive electrode active material and a cobalt-cerium compound is used as an electronic conductive additive.

The cobalt-cerium compound is a compound containing cobalt and cerium which were allowed to simultaneously precipitate by the coprecipitation method. From the results of X-ray analysis, it has been confirmed that a crystal structure thereof contains a cobalt oxyhydroxide phase having a crystal structure of the R3m space group structure as the rhombohedron structure and a cerium dioxide phase having a crystal structure of the Fm3m space group structure as the fluorite structure, and the cobalt-cerium compound has a structure in which a portion of cobalt in the cobalt oxyhydroxide phase is substituted with cerium and a portion of cerium in the cerium dioxide phase is substituted with cobalt. That is, it forms a so-called solid solution.

Although the cobalt-cerium compound is prepared by the coprecipitation method as described above, as the preparation method, there are a method of preparing the cobalt-cerium compound separately and a method of uniting the cobalt-cerium compound with nickel hydroxide in the course of the formation thereof, in the embodiment, the case where the cobalt-cerium compound is prepared by a method of uniting the cobalt-cerium compound with nickel hydroxide in the course of the formation thereof will be described.
[Preparation of Nickel Hydroxide Particles]

First, reference will be made to the preparation of nickel hydroxide.

Specific preparation examples of nickel hydroxide particles include adding an aqueous solution in which nickel sulfate is dissolved, with vigorous stirring, dropwise to an aqueous ammonium sulfate solution with a concentration of 1 mol/liter which is adjusted to pH 12 and prepared by allowing the temperature to be controlled to 45° C. The pH adjustment may be carried out by using an 18 wt % aqueous NaOH solution. The mixture is then filtered, washed with water, and dried, and nickel hydroxide particles which are spherical in shape are obtained. In this context, a portion of nickel (Ni) in nickel hydroxide may be substituted with zinc (Zn), cobalt (Co), or the like.
[Preparation of Cobalt-Cerium Compound]

Next, reference will be made to the preparation of the cobalt-cerium compound.

As described above, in the embodiment, the cobalt-cerium compound is united with nickel hydroxide particles prepared as above in the course of the formation thereof. More specifically, via the step of allowing a compound, containing cobalt and cerium to be precipitated over the surface of nickel hydroxide particles, nickel hydroxide particles and a cobalt-cerium compound are united in a state of coating the surface of nickel hydroxide particles with the cobalt-cerium compound.

In the treatment for coating the surface of nickel hydroxide particles with the cobalt-cerium compound, first, an aqueous solution containing cobalt ions and cerium ions is added dropwise to a pH-adjusted aqueous solution mixed with the above mentioned nickel hydroxide particles. By this operation, a hydroxide containing cobalt and cerium precipitates over the surface of nickel hydroxide particles.

More specific treatment examples include adding the nickel hydroxide particles prepared as described, above to a 0.1 mol/liter aqueous ammonium sulfate solution and allowing the mixture to be controlled to pH 9 and a temperature of 45° C. and to be vigorously stirred. It is preferred that the temperature be controlled in the range of 30° C. to 60° C. When it is lower than 30° C., there is a possibility that dispersibility of cerium is lowered. When it is a temperature of higher than 60° C., there is a possibility that low conductive material such as $CO_3O_4$ forms. Furthermore, it is preferred that the temperature range be the range of 40° C. to 50° C. In such a range, it is made possible to homogeneously coat the nickel hydroxide particles and to make conductivity high.

The pH adjustment is carried out by using an 18 wt % aqueous NaOH solution. To this solution, an aqueous solution in which cobalt sulfate and cerium nitrate are dissolved in a predetermined ratio is added dropwise. The mixture is then filtered, washed with water, and dried, and nickel hydroxide particles coated with a hydroxide containing cerium and cobalt are obtained.

By subjecting the nickel hydroxide particles in a state of allowing the hydroxide containing cobalt and cerium to precipitate over the surface to the subsequent oxidation treatment, nickel hydroxide particles with a surface coated with the cobalt-cerium compound may be obtained. On the oxidation treatment, it is preferred that the particles be heated in a state of being mixed with an aqueous sodium hydroxide solution. With regard to the amount of the aqueous sodium hydroxide solution to be used mixed, it is preferred that the aqueous solution be mixed so as to allow the atomic ratio to be 0.5 or more in terms of (Na/(Co+Ce+Ni)).

More specific examples of the oxidation treatment include adding 40 g of 48 wt % aqueous NaOH solution to 50 g of nickel hydroxide particles in the state of allowing the hydroxide containing cobalt and cerium to precipitate over the surface and heating the mixture in the atmosphere for 1 hour at 120° C. The mixture is then filtered, washed with water, and dried, and the desired active material particles are prepared. By this step, nickel hydroxide particles with a surface coated with the cobalt-cerium compound are obtained.

By allowing the cobalt-cerium compound to be precipitated using this method, a positive electrode for an alkaline secondary battery having low internal resistance may be obtained since a network of cobalt-cerium compounds is formed in the inferior of the electrode, and the amount thereof used may be significantly reduced.

The amount of the cobalt-cerium compound coated may be in the mass ratio of 0.5 to 10% and preferably 3 to 7% relative to the whole positive electrode material. Moreover, the cerium content in the cobalt-cerium compound in terms of (Ce/(Co+Ce)) may be in the atomic ratio of 5 to 40%, and is preferably 10 to 30% and more preferably 15 to 30%. When it is equal to or more than 5% the compound is capable of having high reducibility, and when it is equal to or more than 10% further enhancement in reducibility is noted. When it is more than 40% the specific resistance value shows a tendency to increase.

[Mixing with Other Materials]

The nickel hydroxide particles prepared as above (those with a surface coated with the cobalt-cerium compound) are further powder mixed with other materials.

The other materials that become the objects for mixing include a compound with at least one element of calcium (Ca), yttrium (Y), europium (Eu), holmium (Ho), erbium (Er), thulium (Tm), ytterbium (Yb) and lutetium (Lu), and more specifically, the compound is an oxide of each element described above. In this context, the compound is not limited to the oxide as long as it is capable of dissolving in an alkaline solution, and for example, it may be a hydroxide.

A positive electrode for an alkaline secondary battery is prepared by using the positive electrode material prepared as stated above.

[Specific Characteristics Evaluation with Test Cell]

In the following, reference will be made to the evaluation for specific characteristics of the positive electrode material prepared as above.

The specific characteristics evaluation of the positive electrode material was carried out by using a test cell.

Specific production step of the test cell is briefly described.

The positive electrode material prepared as above is mixed with an aqueous solution having a carboxymethyl cellulose (CMC) with concentration of 1% by mass and polytetrafluoroethylene (PTFE) in 0.3% by mass content to make it into a paste form. The material to be included in the positive electrode material and the percent composition thereof are varied as described below.

The positive electrode paste is charged into a sponged nickel foam substrate having a thickness of 1.4 mm and a surface density of 450 g/m$^2$, and after drying, is subjected to rolling to obtain an original plate. The original plate was cut into 4-cm by 6-cm plates. In this context, the cobalt-cerium compound coated nickel hydroxide is charged so as to allow the plate with the dimensions to have an electrode capacity of 500 mAh.

The plate was used as a positive electrode plate. An open type cell was obtained by sandwiching the positive electrode plate with negative electrodes of hydrogen absorbing alloy having a capacity of 1500 mAh with separators interposed therebetween and fastening them with a bolt to which the amount of torque of 0.098 Nm was applied.

As an electrolytic solution, a 6.8 mol/L ("L" represents liter) aqueous potassium hydroxide solution was used. Moreover, as a reference electrode, a Hg/HgO electrode was used.

The test cell was evaluated by measuring how the oxygen evolution potential of an alkaline secondary battery varies according to the material to be included in the positive electrode material.

As a specific evaluation method, a process in which the test cell is charged for 15 hours at a charging current of 0.1 ItA in an ambient environment of 20° C., and after an interval of 1 hour, discharged to an end voltage of 0.0 V (a voltage relative to a reference electrode) at a discharge current of 0.2 ItA was repeated, and the η value was determined from the charging curve at the third cycle. The η value is a difference between the oxygen evolution potential and the oxidation potential (potential in a charging reaction) in the positive electrode (nickel electrode), and this means that the larger the value of "η" is, the more raised the oxygen evolution potential is, the smaller the self discharge is, and the larger the charge efficiency is.

The actual η value is calculated from a potential difference between that obtained on 120% charged ampere-hour and that obtained on 75% charged ampere-hour.

The measurement results of "η" value obtained at times when the material included in the positive electrode material and the composition ratio thereof (% by mass) were changed are shown in Table 1.

In this context, in Table 1, together with specific characteristics of positive electrode materials obtained by powder mixing nickel hydroxide particles with a surface coated with the cobalt-cerium compound and the compound (oxide) with at least one element of Ca and the like described above, specific characteristics of positive electrode materials obtained by powder mixing nickel hydroxide particles with a surface coated only with the cobalt compound without the cerium compound and the compound (oxide) with Ca and the like described above are shown, and both indicate how the "η" varies between them.

In Table 1, the material labeled "Ni(OH)$_2$ (coated with Ce—Co)" in the column of "Active material" is a material using nickel hydroxide particles with a surface coated with the cobalt-cerium compound as the active material, and the material labeled "Ni(OH)$_2$ (coated with Co)" in the column of "Active material" is a material using nickel hydroxide particles with a surface coated only with the cobalt compound without the cerium compound as the active material. In the column of "Percent composition of Ce element", a composition ratio of Ce element (Ce metal) to the whole (the whole positive electrode material) is shown in terms of % by mass (mass %).

A material to be added to the above mentioned nickel hydroxide active material by powder mixing is shown in the column of "Material to be mixed", a proportion of the material to be mixed is shown in the column of "The amount of the material to be mixed added" in terms of % by mass relative to the whole positive electrode material, and a composition ratio of the additive element in the material to be mixed to the whole metal element (the whole positive electrode material) is shown in the column of "Percent composition of additive element" in terms of % by mass.

The column of "Total" indicates the sum of a value in "Percent composition of Ce element" and a value in "Percent composition of additive element", and in the column of "η Value", the measurement results of "η" obtained under each preparation condition are shown.

Furthermore, in Table 2, in order to compare a positive electrode material composed only of nickel hydroxide particles with a surface coated with the cobalt-cerium compound and unmixed with a compound with Ca and the like with a positive electrode material composed of nickel hydroxide particles with a surface coated with the cobalt-cerium compound and a compound with Ca and the like, the change in measured values of "η" obtained at times when the percent composition of Ce element in the cobalt-cerium compound was changed is shown. In Table 2, the data obtained at a time when the percent composition of Ce element is 0% by mass, or when nickel hydroxide particles with a surface coated with the cobalt compound instead of the cobalt-cerium compound are used as the active material is also shown.

In Table 2, the material having the "Percent composition of Ce element" of 0.8% by mass corresponds to a material having the abundance ratio of Ce in the cobalt-cerium compound of 10 mol %, the material having the percent composition of 1.5% by mass corresponds to a material having the abundance ratio of 20 mol %, and the material having the percent composition of 2% by mass corresponds to a material having the abundance ratio of 30 mol %.

Furthermore, in Table 3, the data obtained at times when cerium was allowed to mixedly coexist in the positive electrode material by powder mixing a cerium compound (specifically, $CeO_2$) in the same manner as for the compound with ytterbium and the like in Table 1 to prepare a positive electrode for an alkaline secondary battery are shown as a comparative example. The step of preparing the positive electrode for an alkaline secondary battery is common to each data in Table 1.

In Table 3, the data about a positive electrode material prepared by powder mixing nickel hydroxide particles with a surface coated with the cobalt-cerium compound and a cerium compound is shown in the top row, the data about a positive electrode material prepared by powder mixing nickel hydroxide particles with a surface coated with the cobalt compound and a cerium compound is shown in the middle row, and the data about a positive electrode material prepared by powder mixing nickel hydroxide particles with a surface coated with the cobalt compound, a cerium compound and a ytterbium compound is shown in the lowest row.

The meanings of columns such as "Percent composition of Ce element" explaining each data are common to those in Table 1.

TABLE 1

| Active material | Percent composition of Ce element (% by mass) | Material to be mixed | The amount of the material to be mixed added (% by mass) | Percent composition of additive element (% by mass) | Total (% by mass) | η Value (V) |
| --- | --- | --- | --- | --- | --- | --- |
| $Ni(OH)_2$ (coated with Ce—Co) | 1.5 | CaO | 1.0 | 0.7 | 2.2 | 0.0654 |
| $Ni(OH)_2$ (coated with Co) | 0 | CaO | 1.0 | 0.7 | 0.7 | 0.0831 |
| $Ni(OH)_2$ (coated with Ce—Co) | 1.5 | $Y_2O_3$ | 2.0 | 1.6 | 3.1 | 0.0533 |
| $Ni(OH)_2$ (coated with Co) | 0 | $Y_2O_3$ | 2.0 | 1.6 | 1.6 | 0.0516 |
| $Ni(OH)_2$ (coated with Ce—Co) | 1.5 | $Er_2O_3$ | 2.0 | 1.7 | 3.2 | 0.054 |
| $Ni(OH)_2$ (coated with Co) | 0 | $Er_2O_3$ | 2.0 | 1.7 | 1.7 | 0.0536 |
| $Ni(OH)_2$ (coated with Ce—Co) | 1.5 | $Yb_2O_3$ | 1.0 | 0.9 | 2.4 | 0.0517 |
| $Ni(OH)_2$ (coated with Ce—Co) | 1.5 | $Yb_2O_3$ | 2.0 | 1.8 | 3.3 | 0.0527 |
| $Ni(OH)_2$ (coated with Co) | 0 | $Yb_2O_3$ | 0.5 | 0.4 | 0.4 | 0.0479 |
| $Ni(OH)_2$ (coated with Co) | 0 | $Yb_2O_3$ | 1.0 | 0.9 | 0.9 | 0.049 |

TABLE 1-continued

| Active material | Percent composition of Ce element (% by mass) | Material to be mixed | The amount of the material to be mixed added (% by mass) | Percent composition of additive element (% by mass) | Total (% by mass) | η Value (V) |
|---|---|---|---|---|---|---|
| Ni(OH)$_2$ (coated with Co) | 0 | Yb$_2$O$_3$ | 2.0 | 1.8 | 1.8 | 0.0507 |
| Ni(OH)$_2$ (coated with Co) | 0 | Yb$_2$O$_3$ | 4.0 | 3.5 | 3.5 | 0.516 |
| Ni(OH)$_2$ (coated with Ce—Co) | 1.5 | Lu$_2$O$_3$ | 2.0 | 1.8 | 3.3 | 0.0517 |
| Ni(OH)$_2$ (coated with Co) | 0 | Lu$_2$O$_3$ | 2.0 | 1.8 | 1.8 | 0.05 |

TABLE 2

| Active material | Percent composition of Ce element (% by mass) | η Value (V) |
|---|---|---|
| Ni(OH)$_2$ (coated with Co) | 0 | 0.0449 |
| Ni(OH)$_2$ (coated with Ce—Co) | 0.8 | 0.0465 |
| Ni(OH)$_2$ (coated with Ce—Co) | 1.5 | 0.0476 |
| Ni(OH)$_2$ (coated with Ce—Co) | 2 | 00482 |

TABLE 3

| Active material | Percent composition of Ce element (% by mass) | Material to be mixed | The amount of the material to be mixed added (% by mass) | Percent composition of additive element (% by mass) | Total (% by mass) | η Value (V) |
|---|---|---|---|---|---|---|
| Ni(OH)$_2$ (coated with Ce—Co) | 1.5 | CeO$_2$ | 2.0 | 1.6 | 3.1 | 0.0464 |
| Ni(OH)$_2$ (coated with Co) | 0 | CeO$_2$ | 2.0 | 1.6 | 1.6 | 0.0446 |
| Ni(OH)$_2$ (coated with Co) | 0 | CeO$_2$ + Yb$_2$O$_3$ | 2.0 2.0 | 1.6 1.8 | 3.4 | 0.0505 |

With regard to the measurement results in Table 1 and Table 2, first, reference will be made to the case where a compound with ytterbium (Yb) (Yb$_2$O$_3$) is mixed.

In FIG. 1, values of "η" obtained at times when a positive electrode material prepared by powder mixing nickel hydroxide particles with a surface coated with the cobalt-cerium compound and a compound with ytterbium (Yb$_2$O$_3$) was used are shown by points of outlined square, and for comparison, values of "η" obtained at times when a positive electrode material prepared by powder mixing nickel hydroxide particles with a surface coated with the cobalt compound instead of the cobalt-cerium compound and a compound with ytterbium (Yb$_2$O$_3$) was used are shown by points of outlined circle, and furthermore, values of "η" obtained at times when the percent composition of Ce element in the cobalt-cerium compound was changed in the positive electrode material composed only of hydroxide particles with a surface coated with the cobalt-cerium compound are shown by points of outlined triangle.

In this context, the horizontal axis in FIG. 1 indicates the percent composition of ytterbium (% by mass) for a positive electrode material mixed with Yb$_2$O$_3$ and indicates the percent composition of cerium (Ce) (% by mass) for that unmixed with Yb$_2$O$_3$.

Moreover, the data obtained at a time when a positive electrode material containing neither Yb$_2$O$_3$ nor Ce, namely, a positive electrode material composed only of nickel hydroxide particles with a surface coated with the cobalt compound was used is shown by both outlined circle and outlined triangle.

As apparent from FIG. 1, it is revealed that the value of "η" is gradually raised as the mixing proportion of the compound with ytterbium in the positive electrode material is allowed to become larger, and when the percent composition of ytterbium becomes equal to or more than 1% by mass, the degree of the rise in "η" becomes smaller.

On the other hand, as the percent composition of cerium in the cobalt-cerium compound coating the surface of nickel hydroxide particles increases, "η" is also raised.

Although the description of specific data is omitted, in case where a calcium compound (more specifically, CaO) was used instead of the compound with ytterbium, the slope is steeper with regard to the change in the value of "η", and when the percent composition of calcium element becomes equal to or more than 0.1% by mass, the degree of the rise in "η" becomes smaller.

Moreover, in case where a compound with yttrium (more specifically, Y$_2$O$_3$) was used instead of the compound with ytterbium, when the percent composition of yttrium element becomes equal to or more than 0.5% by mass, the degree of the rise in "η" becomes smaller.

Furthermore, in case where a compound with at least one element of europium, holmium, erbium, thulium and lutetium (more specifically, an oxide of each element) was used instead of the compound with ytterbium or together with the compound with ytterbium, specific characteristics thereof are similar to those in the case where the ytterbium compound was used, and when the percent composition of these elements becomes equal to or more than 1% by mass, the degree of the rise in "η" becomes smaller.

When attention is paid to the data (data A and data B shown by points of outlined square in FIG. 1) obtained at times when a positive electrode material prepared by powder mixing nickel hydroxide particles with a surface coated with the cobalt-cerium compound and $Yb_2O_3$ was used, the values of "η" in these data are appreciably enhanced compared to those in the data (data shown by points of outlined circle in FIG. 1) obtained at times when a positive electrode material prepared by powder mixing nickel hydroxide particles with a surface coated with the cobalt compound and $Yb_2O_3$ was used, in case where both data having the same percent composition of ytterbium are compared.

In FIG. 1, furthermore, the data obtained at times when a positive electrode material prepared by powder mixing nickel hydroxide particles with a surface coated with the cobalt-cerium compound and $Yb_2O_3$ was used and when the value of "Total" in Table 1 instead of the percent composition of ytterbium, namely, the sum of the percent composition of cerium element and the percent composition of ytterbium element was taken as the abscissa and plotted on the horizontal axis are shown by points of filled square (data A' and data B'). The data A' and data B' correspond to the data A and data B, respectively.

Because of the contrast between the data shown by points of filled square and the data shown by points of outlined circle in FIG. 1, it can be seen that the value of "η" obtained at times when a positive electrode material prepared by powder mixing nickel hydroxide particles with a surface coated with the cobalt-cerium compound, and $Yb_2O_3$ was used is better than that obtained at times when a positive electrode material prepared by mixing nickel hydroxide particles with a surface coated with the cobalt compound and $Yb_2O_3$ having the percent composition of ytterbium that corresponds to the sum of the percent composition of cerium and the percent composition of ytterbium in the positive electrode material was used (data shown by points of outlined circle in FIG. 1).

Furthermore, in case where $Yb_2O_3$ was used, since $Yb_2O_3$ has high resistivity, as the mixing proportion thereof is allowed to become larger, the resistivity of the positive electrode material becomes larger. In contrast, since the cobalt-cerium, compound has been primarily used as a electronic conductive additive, the increase in resistivity is not caused owing to the presence of cerium, and that, owing to high performance in reduction resistance on overdischarge, it functions as an electronic conductive additive capable of inhibiting deterioration in specific characteristics and there is no problem to allow the mixing proportion to become higher.

Thus, substituting the cobalt-cerium compound for $Yb_2O_3$ has effects both on the point that the rise in resistivity of the positive electrode material can be inhibited and on the point that the "η" can be raised. Moreover, this contributes to the reduction in material costs in the point that expensive cobalt is substituted with cerium.

In case where the mixing proportion of the compound with ytterbium (Yb) element (specifically, an oxide) is set to 1% by mass or more in terms of the abundance ratio of the ytterbium metal element relative to the whole positive electrode material (the mixing proportion is set in the domain where the degree of the rise in oxygen evolution potential becomes smaller), it is especially preferred because the effects described above become significant compared to the conventional technique in which the cobalt-cerium compound is not used.

The data obtained at times when the cerium compound ($CeO_2$) shown in Table 3 was included in the positive electrode material by powder mixing is also shown in FIG. 1 for comparison with the data obtained at times when the above described compound with ytterbium was included in the positive electrode material.

The data obtained at times when a positive electrode material prepared by powder mixing nickel hydroxide particles with a surface coated with the cobalt-cerium compound and the cerium compound was used are shown by points of filled triangle in FIG. 1, and the composition ratio of cerium element in the cobalt-cerium compound coating nickel hydroxide particles to the whole positive electrode material (namely, the value of "Percent composition of Ce element") is taken as the abscissa and plotted on the horizontal axis.

When this data is compared with the data of the material composed only of the cobalt-cerium compound and having the same value of "1.5% by mass" as the value of "Percent composition of Ce element" (a point of outlined triangle), it is found, that even if nickel hydroxide particles with a surface coated with the cobalt-cerium compound are added with the cerium compound ($CeO_2$) by powder mixing, the value of "η" is not raised and is rather lowered.

The data shown by "A" and "B" in FIG. 1 are the data of the material prepared by powder mixing nickel hydroxide particles with a surface coated with the cobalt-cerium compound and the compound with ytterbium and having the same value of "1.5% by mass" as the value of "Percent composition of Ce element", and as compared with the data of the material prepared by powder mixing the cerium compound, there is found a considerable gap in the degrees of the enhancement in the value of "η".

The data obtained at a time when a positive electrode material prepared by powder mixing nickel hydroxide particles with a surface coated with the cobalt compound and the cerium compound was used shows the same tendency as that described above.

This data is shown by a point of outlined point-down triangle in FIG. 1 and the value of "Percent composition of Ce element" (namely, 0% by mass) is taken as the abscissa and plotted on the horizontal axis.

As compared with the data of the material composed only of nickel hydroxide particles with a surface coated with the cobalt compound and having the same value of "0% by mass" as the value of "Percent composition of Ce element" (points of outlined point-up triangle), even if nickel hydroxide particles with a surface coated with the cobalt compound are added with the cerium compound ($CeO_2$) by powder mixing, the value of "η" is not raised and is rather lowered.

Furthermore, this tendency is also the same as that in case where the positive electrode for an alkaline secondary battery was composed of the positive electrode material prepared by powder mixing nickel hydroxide particles with a surface coated with the cobalt compound, the cerium compound and the ytterbium compound.

The data shown in the lowest row in Table 3, namely, the data about the positive electrode material prepared by powder mixing nickel hydroxide particles with a surface coated with the cobalt compound, the cerium compound and the ytterbium compound is shown by a point of "X" mark in FIG. 1. The horizontal axis indicates the percent composition of ytterbium element and "1.8% by mass" is taken as the abscissa and plotted on the horizontal axis.

As compared with the data of the positive electrode material prepared by powder mixing nickel hydroxide particles with a surface coated with the cobalt compound and the ytterbium compound ($Yb_2O_3$) in "1.8% by mass" proportion of ytterbium element, even if the positive electrode material is further added with the cerium compound ($CeO_2$) by powder mixing, the value of "η" is not raised and is rather lowered.

Figure 4:
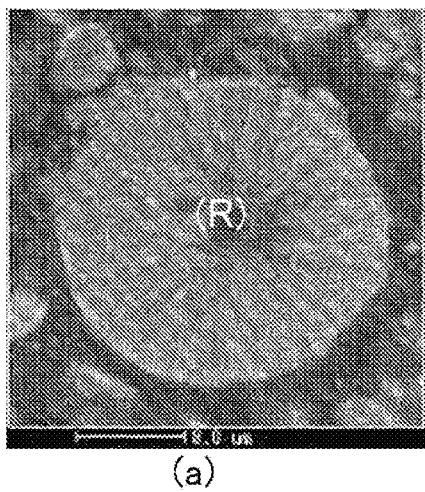
FIG. 4 is analysis images as contrasts to those of the present invention.
Figure 4:
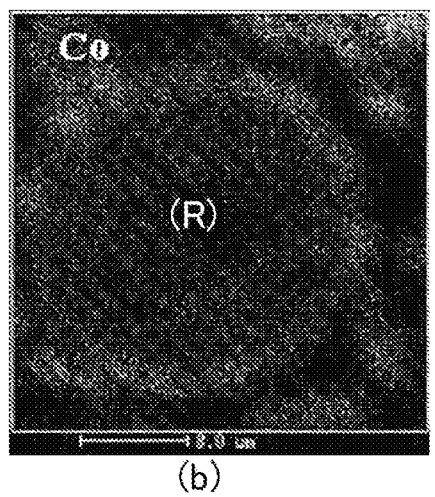
Figure 4:
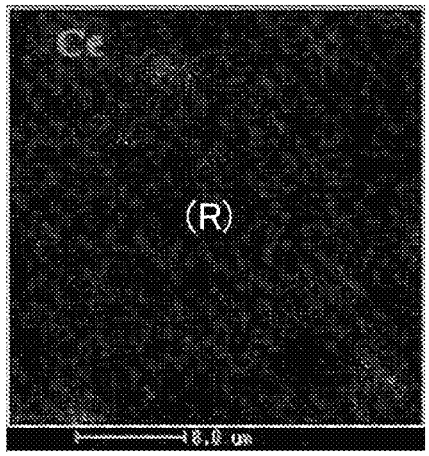

In case where the cerium compound is included in the positive electrode material by powder mixing in this way, any combination does not contribute to the rise in "η", and as described by reference to FIG. 4(c), this corresponds to the condition where almost no cerium element added by powder mixing is present either in the interior or on the surface of nickel hydroxide particles.

In the following, reference will be made to additive elements other than ytterbium.

Figure 2:
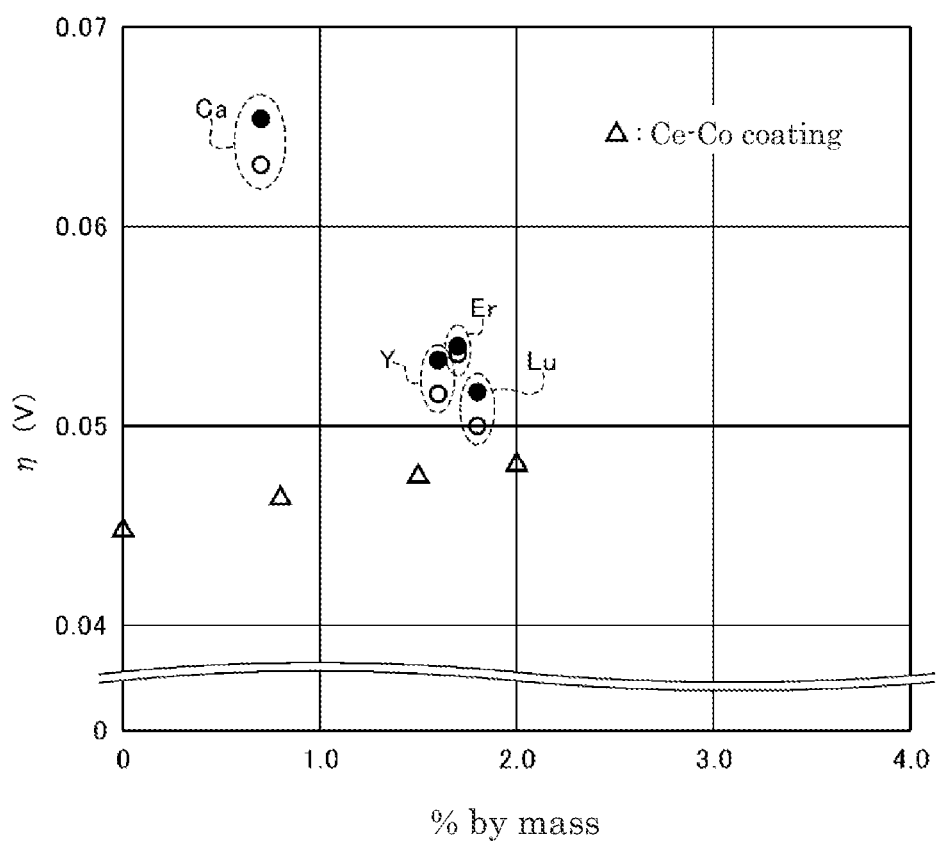
FIG. 2 is a graph showing the measurement results in accordance with embodiments of the present invention.
Figure 3:
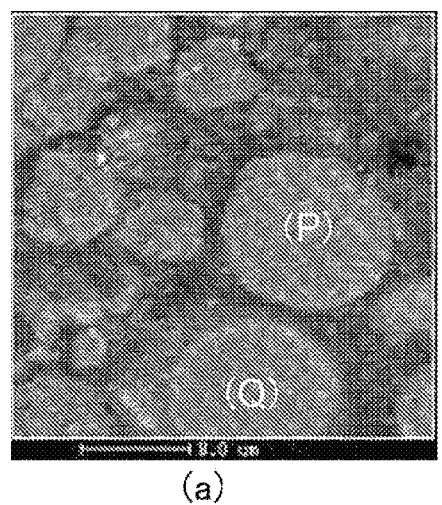
FIG. 3 is analysis images for explaining the present invention.
Figure 3:
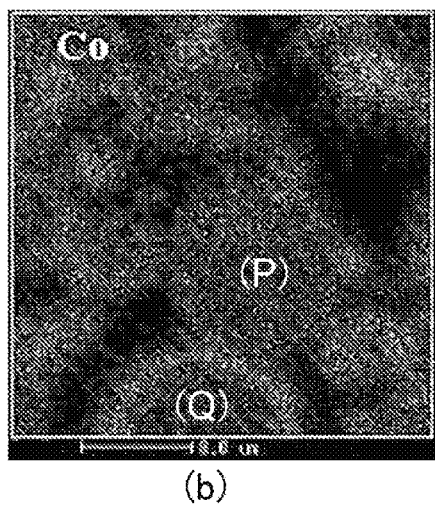
Figure 3:
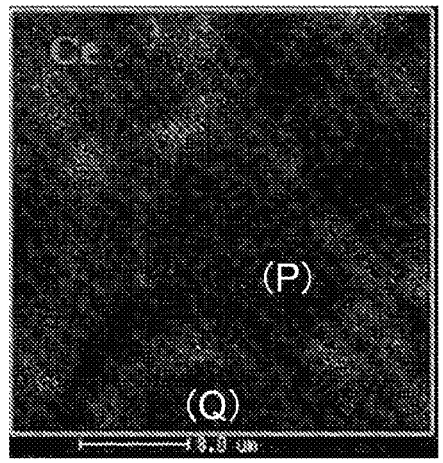
Figure 3:
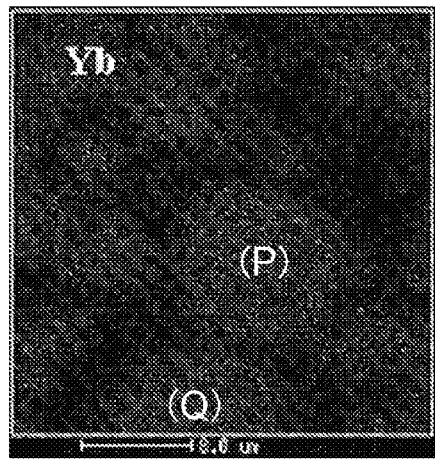

The measurement results of "η" obtained in case where the compound with calcium (Ca), yttrium (Y), erbium (Er), or lutetium (Lu) (any of these is an oxide) in Table 1 was mixed with nickel hydroxide particles with a surface coated with the cobalt-cerium compound are shown by points of filled circle in FIG. 2. FIG. 2 is drawn on the same scale as that in FIG. 1 described above.

In FIG. 2, for comparison, the measurement results of "η" obtained in case where the compound, with, calcium (Ca), yttrium (Y), erbium (Er), or lutetium (Lu) (any of these is an oxide) was mixed with nickel hydroxide particles with a surface coated with the cobalt compound are shown by points of outlined circle in FIG. 2 in conjunction with the points of filled circle, and for reference, the values of "η" about the positive electrode materials obtained at times when the percent composition of cerium element in the cobalt-cerium compound was changed without mixing Ca and the like are shown by points of outlined triangle.

Furthermore, in FIG. 2, the data for the elements associated with each other are surrounded by a broken line, and a symbol for the element is given for the data.

From FIG. 2, it is confirmed that in case where the positive electrode material was prepared by mixing the compound with calcium (Ca), yttrium (Y), erbium (Er), or lutetium (Lu) (any of these is an oxide) with nickel hydroxide particles with a surface coated with the cobalt-cerium compound, the value of "η" is enhanced with regard to any element as well as ytterbium described above.

Besides, with regard to europium (Eu), holmium (Ho), and thulium (Tm), they have the same properties. In case where the positive electrode material was prepared by mixing these compounds (more specifically, oxides) with nickel hydroxide particles with a surface coated with the cobalt-cerium compound, the value of "η" can be enhanced.

In case where the positive electrode material is prepared by mixing the compound with at least one element of europium (Eu), holmium (Ho), erbium (Er), thulium (Tm) and lutetium (Lu) with nickel hydroxide particles with a surface coated with the cobalt-cerium compound as well as the case of ytterbium described above, it is preferred that the mixing proportion of the compound with at least one element of europium, holmium, erbium, thulium and lutetium be set to 1% by mass or more in terms of the abundance ratio of the element relative to the whole positive electrode material.

In contrast, in case where the positive electrode material is prepared by mixing the compound with calcium (Ca) with nickel hydroxide particles with a surface coated with the cobalt-cerium compound, in view of the variation characteristic of "η" described above, it is preferred that the mixing proportion of the compound with calcium (Ca) be set to 0.1% by mass or more in terms of the abundance ratio of calcium element relative to the whole positive electrode material.

Furthermore, with regard to yttrium (Y), in case where the positive electrode material is prepared by mixing the compound with yttrium with nickel hydroxide particles with a surface coated with the cobalt-cerium compound, in view of the variation characteristic of "η" described above, it is preferred that the mixing proportion of the compound with yttrium be set to 0.5% by mass or more in terms of the abundance ratio of yttrium element relative to the whole positive electrode material.

[Production of Positive Electrode for Alkaline Secondary Battery]

In the following, the process of preparing a positive electrode for an alkaline secondary battery (more specifically a nickel metal hydride battery) by using the positive electrode material prepared as described above will be schematically described.

First, the positive electrode material is added with an aqueous carboxymethyl cellulose (CMC) solution and the like to make it into a paste form. The material to be included in the positive electrode material and the percent composition thereof are set on the basis of the evaluation results obtained with the test cell described above.

The paste is charged into a substrate with electron, conductivity such as a porous nickel substrate, after which subjected to drying treatment, and pressed into a predetermined thickness to obtain a positive electrode for an alkaline secondary battery.

[Production of Alkaline Secondary Battery]

In the following, the step of producing an alkaline secondary battery by using the positive electrode for an alkaline secondary battery will be schematically described. In this context, detailed description for welding at individual parts and the like is omitted.

A paste composed mainly of hydrogen absorbing alloy powder is applied to a negative electrode substrate made of a perforated steel sheet prepared by subjecting iron to nickel plating, dried and then pressed into a predetermined thickness to prepare a negative electrode.

The negative electrode, a separator made of polypropylene nonwoven fabric, and the positive electrode described above are laminated, and the laminate is spirally wound so as to form a roll state.

After a positive-electrode current collecting plate and a negative-electrode current collecting plate are attached to the laminate, this is inserted into a closed-end cylindrical casing and injected with an electrolytic solution.

Following this, the circumference of the open end is attached with a ring-shaped gasket and attached with a discoid lid having a cap-shaped terminal and the like in a state that makes electrical contact with the positive-electrode current collecting plate, and the open end of the casing is fixed by caulking.

Another Embodiment

Hereinafter, another embodiment of the present invention will be described.

In the above mentioned embodiment, the preparation method of the cobalt-cerium compound is described by reference to a method of uniting the cobalt-cerium compound with nickel hydroxide in the course of the formation thereof, but a method of preparing the cobalt-cerium compound separately may be used.

Specifically, first an aqueous solution containing cobalt ions and cerium ions is prepared by dissolving a cobalt compound and a cerium compound, and a hydroxide containing cobalt and cerium is allowed to precipitate in the aqueous solution by adjusting the pH of the aqueous solution. The precipitate is filtered, washed with water, and dried, and a cobalt-cerium hydroxide is obtained.

Furthermore, by subjecting the hydroxide containing cobalt and cerium to a heat treatment in the presence of oxygen, an oxidation treatment is conducted to obtain a cobalt-cerium compound. As a method of conducting the oxidation treatment, a method of heating the hydroxide containing cobalt and cerium in the atmosphere may be used.

The cobalt-cerium compound thus prepared may be used as an electronic conductive additive by being mixed with a powder of nickel hydroxide as an active material.

The compound is further powder mixed with a compound with at least one element of calcium, yttrium, europium, holmium, erbium, thulium, ytterbium and lutetium to obtain a positive electrode material.

DESCRIPTION OF REFERENCE SIGNS

A Data
A' Data
B Data
B' Data

The invention claimed is:

1. An alkaline secondary battery provided with a positive electrode, a negative electrode, an electrolytic solution and a separator, comprising a positive electrode containing a substrate and a positive electrode material having nickel hydroxide, a cobalt-cerium compound, and a compound with at least one element of calcium, yttrium, europium, holmium, erbium, thulium, ytterbium and lutetium,
wherein the cobalt-cerium compound contains a cobalt oxyhydroxide phase having an R3m crystal structure and a rhombohedron crystal structure and a cerium dioxide phase having a Fm3m crystal structure and a fluorite crystal structure; and
the cobalt oxyhydroxide phase has a structure in which a portion of cobalt is substituted with cerium and the cerium dioxide phase has a structure in which a portion of cerium is substituted with cobalt.

2. The alkaline secondary battery according to claim 1, wherein
the nickel hydroxide is formed in a particulate form,
the cobalt-cerium compound is arranged to be in a state of coating the surface of the nickel hydroxide in a particulate form, and
the compound with at least one element of thulium, ytterbium and lutetium is arranged to be in a state of being dispersed inside the nickel hydroxide in a particulate form.

3. The alkaline secondary battery according to claim 1, wherein
the positive electrode containing a positive electrode material having nickel hydroxide, a cobalt-cerium compound, and a calcium compound is provided, and
the mixing proportion of the calcium compound is set to 0.1% by mass or more in terms of the abundance ratio of the calcium element relative to the total of the nickel hydroxide, the cobalt-cerium compound, and the calcium compound.

4. The alkaline secondary battery according to claim 1, wherein
the positive electrode containing a positive electrode material having nickel hydroxide, a cobalt-cerium compound, and a compound with yttrium is provided, and
the mixing proportion of the yttrium compound is set to 0.5% by mass or more in terms of the abundance ratio of the yttrium element relative to the total of the nickel hydroxide, the cobalt-cerium compound, and the compound with yttrium.

5. The alkaline secondary battery according to claim 1, wherein
the positive electrode containing a positive electrode material having nickel hydroxide, a cobalt-cerium compound, and a compound with at least one element of europium, holmium, erbium, thulium, ytterbium and lutetium is provided, and
the mixing proportion of the compound with at least one element of europium, holmium, erbium, thulium, ytterbium and lutetium is set to 1% by mass or more in terms of the abundance ratio of the at least one element of europium, holmium, erbium, thulium, ytterbium and lutetium relative to the total of the nickel hydroxide, the cobalt-cerium compound, and the compound with at least one element of europium, holmium, erbium, thulium, ytterbium and lutetium.

6. The alkaline secondary battery according to claim 1, wherein the abundance ratio of cerium element contained in the cobalt-cerium compound is 5% by atom or more and 40% by atom or less relative to the total of the cerium element and the cobalt element.

7. The alkaline secondary battery according to claim 1, wherein the abundance ratio of cerium element contained in the cobalt-cerium compound is 10% by atom or more and 30% by atom or less relative to the total of the cerium element and the cobalt element.

8. The alkaline secondary battery according to claim 1, wherein the percentage content of cerium dioxide phase contained in the cobalt-cerium compound is 13% by mass or more and 88% by mass or less relative to the total of the cobalt oxyhydroxide phase and the cerium dioxide phase.

9. A positive electrode material, comprising nickel hydroxide, a cobalt-cerium compound, and a compound with at least one element of calcium, yttrium, europium, holmium, erbium, thulium, ytterbium and lutetium,
wherein the cobalt-cerium compound contains a cobalt oxyhydroxide phase having an R3m crystal structure and a rhombohedron crystal structure and a cerium dioxide phase having a Fm3m crystal structure and a fluorite crystal structure; and
the cobalt oxyhydroxide phase has a structure in which a portion of cobalt is substituted with cerium and the cerium dioxide phase has a structure in which a portion of cerium is substituted with cobalt.

10. A method for manufacturing a positive electrode material for an alkaline secondary battery, comprising the step of preparing the positive electrode material by mixing nickel hydroxide, a cobalt-cerium compound, and a compound with at least one element of calcium, yttrium, europium, holmium, erbium, thulium, ytterbium and lutetium so that the cobalt-cerium compound contains a cobalt oxyhydroxide phase having an R3m crystal structure and a rhombohedron crystal structure and a cerium dioxide phase having a Fm3m crystal structure and a fluorite crystal structure, and the cobalt oxyhydroxide phase has a structure in which a portion of cobalt is substituted with cerium and the cerium dioxide phase has a structure in which a portion of cerium is substituted with cobalt.

11. The method for manufacturing a positive electrode material for an alkaline secondary battery according to claim 10, wherein the nickel hydroxide particles are coated with a cobalt-cerium compound.

12. The method for manufacturing a positive electrode material for an alkaline secondary battery according to claim 11, wherein
the nickel hydroxide particles coated with a cobalt-cerium compound are formed by allowing a compound containing cobalt and cerium to precipitate over the surface of nickel hydroxide particles in an aqueous solution, and
the temperature of the aqueous solution is controlled to be at 30° C. or more and 60° C. or less.

13. The method for manufacturing a positive electrode material for an alkaline secondary battery according to claim 11, wherein
the nickel hydroxide particles coated with a cobalt-cerium compound are formed by allowing a compound containing cobalt and cerium to precipitate over the surface of nickel hydroxide particles in an aqueous solution,
the aqueous solution contains cobalt ions and cerium ions, and
the proportion of the cerium ions contained in the aqueous solution is set in the range of 5% by atom or more and 40% by atom or less relative to the total of the cobalt ions and the cerium ions.

14. The alkaline secondary battery according to claim 5, wherein
the nickel hydroxide is formed in a particulate form,
the cobalt-cerium compound is arranged to be in a state of coating the surface of the nickel hydroxide in a particulate form, and
the compound with at least one element of thulium, ytterbium and lutetium is arranged to be in a state of being dispersed inside the nickel hydroxide particle in a particulate form.

15. The alkaline secondary battery according to claim 1, wherein
the nickel hydroxide is formed in a particulate form, and
the cobalt-cerium compound is arranged to be in a state of coating the surface of the nickel hydroxide in the particulate form.

16. The alkaline secondary battery according to claim 1, wherein
the positive electrode material comprises a compound with at least one element selected from the group consisting of europium, holmium, thulium, and lutetium.

17. The alkaline secondary battery according to claim 1, wherein
the abundance ratio of cerium element contained in the cobalt-cerium compound is 15% by atom or more and 30% by atom or less relative to the total of the cerium element and the cobalt element.

18. The alkaline secondary battery according to claim 1, wherein
an amount of the cobalt-cerium compound is 0.5 to 10% by mass with respect to an amount of the positive electrode material.

19. The alkaline secondary battery according to claim 1, wherein
an amount of the cobalt-cerium compound is 3 to 7% by mass with respect to an amount of the positive electrode material.

20. The alkaline secondary battery according to claim 1, wherein
the positive electrode material comprises a compound of lutetium.

* * * * *